UNITED STATES PATENT OFFICE.

JULIUS A. ZIBELL, OF TAPPAN, NEW YORK.

FIRE-RESISTANT COMPOSITION AND PROCESS OF MAKING SAME.

1,273,307.  Specification of Letters Patent.  Patented July 23, 1918.

No Drawing.  Application filed March 9, 1918.  Serial No. 221,515.

*To all whom it may concern:*

Be it known that I, JULIUS A. ZIBELL, a citizen of the United States, and residing at Tappan, county of Rockland, and State of New York, have invented new and useful Improvements in Fire-Resistant Composition and Processes of Making Same, of which the following is a specification.

This invention relates to the treatment of solid materials as wood, burlap, canvas, paper and like fibrous materials to render the same waterproof and fire-resistant and also to the treatment of liquids as alcohols, benzol and like volatile inflammable liquids or mixtures thereof in order to substantially reduce the inflammability thereof. It has for its objects the production of a compound which is non-crystalline and will not weaken fibrous materials to which it is applied and which can be substantially emulsified especially when mixed with waxy bodies so as to render it highly suitable for use in alcoholic paint and varnish removers.

Preferably I prepare my improved product as follows:

Eight parts of unslaked lime are first slaked and sufficient additional water is added to form a thick paste, the same being preferably allowed to stand several hours, the mixture is then strained to drain off the water.

Said residue forms what is hereinafter termed mixture A.

A second mixture B is then prepared by ripening 30 parts of sweet cow's milk, preferably while maintained at a temperature of about 75° F. for about twelve hours. The ripened milk is then thoroughly agitated and pressed through cheese cloth or is then homogenized in a so-called homogenizer or in any other suitable manner to emulsify the particles of cream and the milk. The homogenized mixture is then introduced into a closed vessel and sufficient alkali, for example carbonate of soda, is added to substantially neutralize it, and it is then shaken thoroughly and allowed to stand for about six hours.

A product hereinafter termed C is then obtained by intimately mixing A and B with the addition of ordinary salt thereto in the proportion of one part of salt to sixteen parts of said mixture of products A and B, and preferably the resultant mixture is again forced through cheese cloth or if preferred may be again homogenized in order to effect an intimate mixture of the two products.

Product C may be applied in any suitable manner to wood, burlap, canvas, paper, and like fibrous materials, for example, either by spraying or painting the materials with said composition or by dipping the materials into said product C.

Fibrous materials so treated are rendered highly fire-resistant and furthermore, substantially preserve their original tensile strength. In fact in many cases it will be found that the application of my improved composition will greatly increase the tensile strength and the durability thereof, since it substantially prevents any deleterious action from atmospheric agencies which tend to rot or disintegrate the fibers.

A product C' for use in rendering paint and varnish removers substantially or almost flash-proof at ordinary temperatures is prepared the same as product C except that the addition of the salt is dispensed with.

In order to render a paint and varnish remover containing inflammable liquids such as benzol and wood alcohol, and a few percent, *i. e.*, 2 to 4% of wax, substantially flash-proof, such removers are intimately mixed with product C' in the proportions of about one part of product C' to two parts of remover, or if a stronger paint and varnish remover is required but one part of product C' and three parts of said remover may be employed.

A paint and varnish remover may also be made without employing any wax or wax-like body whatsoever, merely by thoroughly incorporating in an agitator or in a kneading machine, one part of the complete mixture C' with four parts of a wax-free paint and varnish remover such for example as one comprising 66% of benzol, and 34% of methyl alcohol or acetone.

It is evident that in lieu of wood alcohol, other commercial available alcohols may be employed, or ketones as acetone and the like may also be substituted therefor. Similarly, various hydrocarbon bodies which are solvents of wax and serve as solvents or softeners of paint or varnish films may be employed, in lieu of benzol, as toluol or other higher homologues of benzol, etc.

Obviously, if desired, other oils commonly employed in milk substitutes in lieu of the natural butter fat may be homogenized with skimmed milk if desired, such for example as hydrogenated or unhydrogenated cottonseed oil, peanut oil, etc., the amount of same corresponding to the amount of fat which it is desired to replace, though preferably as stated I utilize milk for such purpose.

Various pigments may be incorporated with the aforesaid product C either when finished or at any suitable stage during the process of manufacture thereof, in order to produce a cold water paint of any desired shade. Such product is particularly adapted for use in coating interior plaster or cement walls of buildings, tunnels and the like where a lustrous, glossy, durable and fire-proof finish is desired.

Having thus described my invention, what I claim and desire to secure by Letters Patent is:—

1. The process of making a fire-resistant composition which consists in ripening milk, converting the ripened mixture into a lasting emulsion and incorporating therewith a thickener and a sufficient quantity of a volatile salt to impart substantial fire-proofing properties to said mixture.

2. The process of making fire-resistant composition which consists in ripening milk, converting the ripened mixture into a lasting emulsion and incorporating therewith a substantial quantity of hydrated lime and sodium chlorid.

3. In the process of making a fire-resistant composition, the step which consists in thickening an emulsion of fat and ripened caseinous material with a pasty mass of hydrated lime.

4. The herein described composition for rendering inflammable materials fire-resistant, comprising an emulsified product resulting from the intimate mixture of ripened milk, a preservative and a thickener.

5. The herein described composition for rendering inflammable materials fire-resistant, comprising the product resulting from the intimate mixture of emulsified ripened milk, a preservative, a thickener and a pigment.

6. A composition for rendering inflammable materials fire-resistant or non-flashing, comprising the product resulting from the intimate mixture of fat, ripened caseinous material, a thickener, consisting essentially of hydrated lime, and a sufficient quantity of sodium chlorid to impart fire-resistant and fire-extinguishing properties to said mixture.

Signed at New York, in the county and State of New York, this 8th day of March 1918.

JULIUS A. ZIBELL.

Copies of this patent may be obtained for five cents each, by addressing the "Commissioner of Patents, Washington, D. C."